April 25, 1961  L. PÉRAS  2,981,276
VALVE FOR CHAMBERS UNDER PRESSURE AND
ESPECIALLY FOR PNEUMATIC TIRES
Filed June 18, 1957  3 Sheets-Sheet 1
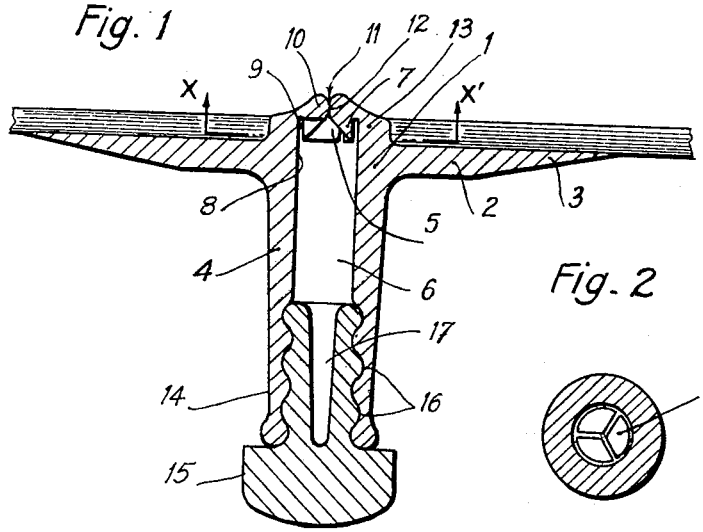
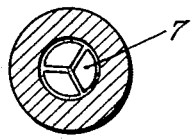
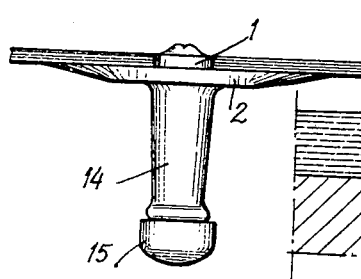
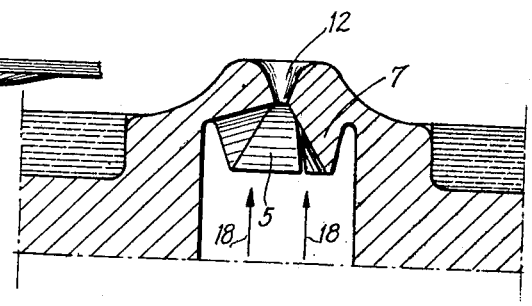
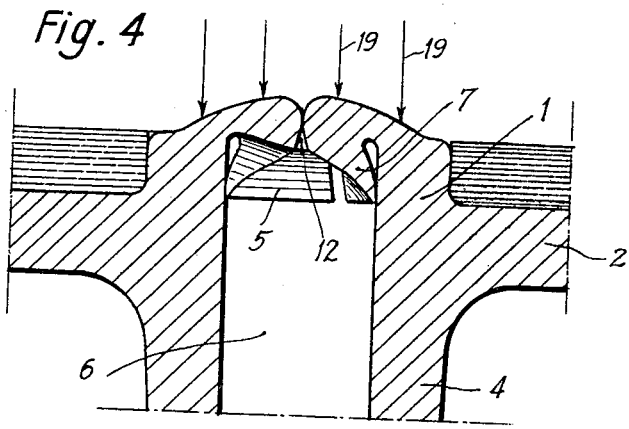

April 25, 1961
L. PÉRAS
2,981,276
VALVE FOR CHAMBERS UNDER PRESSURE AND
ESPECIALLY FOR PNEUMATIC TIRES
Filed June 18, 1957
3 Sheets-Sheet 2
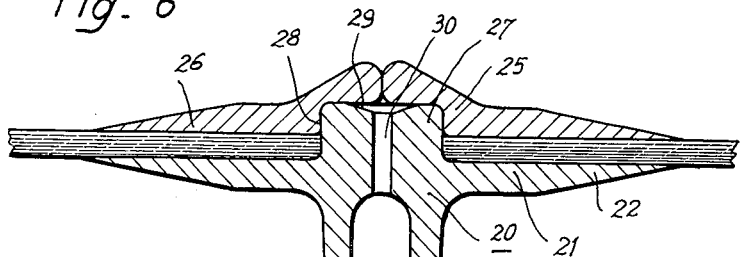
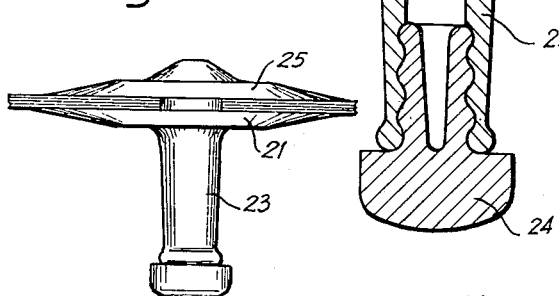
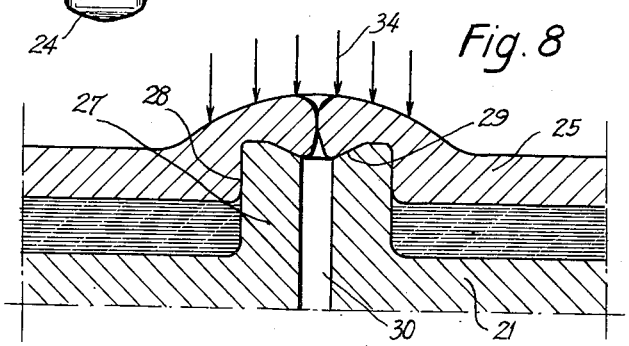
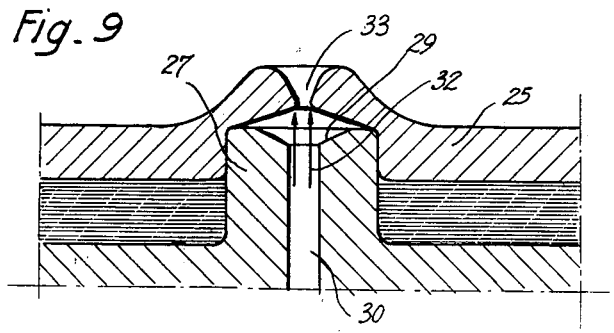

April 25, 1961
L. PÉRAS
2,981,276
VALVE FOR CHAMBERS UNDER PRESSURE AND
ESPECIALLY FOR PNEUMATIC TIRES
Filed June 18, 1957
3 Sheets-Sheet 3
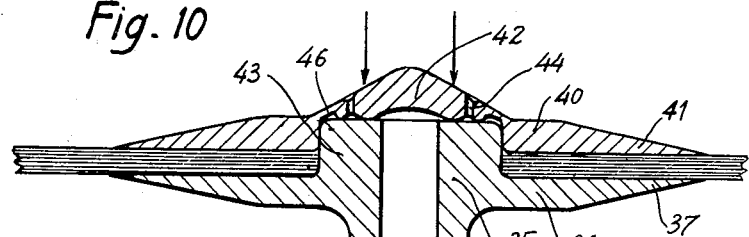
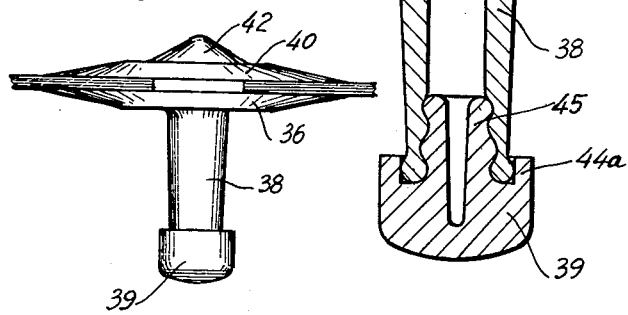
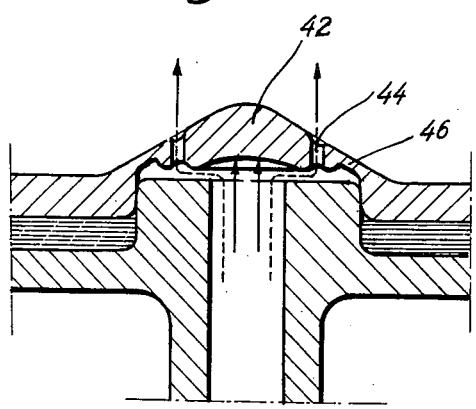
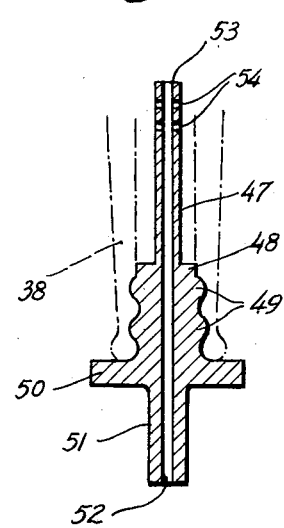

United States Patent Office 2,981,276
Patented Apr. 25, 1961

2,981,276
VALVE FOR CHAMBERS UNDER PRESSURE AND ESPECIALLY FOR PNEUMATIC TIRES

Lucien Péras, Billancourt, France, assignor to Regie Nationale des Usines Renault, Billancourt, France, a French Government works Filed June 18, 1957, Ser. No. 666,301

Claims priority, application France June 28, 1956

3 Claims. (Cl. 137—223)

The present invention relates to a valve for chambers under pressure, and more particularly for pneumatic tires of all kinds, and it is concerned with a valve which is wholly of rubber or plactic material, to the exclusion of all parts such as valves, seats, springs, etc.

This valve is entirely constituted by a tubular body forming the valve stem, associated with a closure device of the same material as the tubular body and having an orifice which opens or closes, depending on the direction of the air under pressure which passes through the valve.

A valve of this kind has the advantage that it does not change during use, since it does not comprise any metallic parts liable to become deformed and to cause faulty operation of the valve.

The valve in accordance with the invention has a number of remarkable advantages as compared with the existing types, resulting from its simplicity, its extremely low cost, its effective action, and its practically unlimited life.

In its application to pneumatic tires, this valve forms an integral part of the air chamber on which it is mounted: it will last as long as the chamber lasts, and will not require any particular attention during the whole period of its use.

In accordance with a particular form of embodiment of the closure device, this valve, which can of course be used for pneumatic tires, can also be employed with advantage for pneumatic apparatus, the compressed air chamber of which is required more particularly to be made practically undeflatable.

These properties will become more clearly apparent from the description which follows below, reference being made to the accompanying drawings, in which:

Fig. 1 is a view in longitudinal cross-section of a valve in accordance with the invention;

Fig. 2 is a view in transverse cross-section, taken along the line X—X' of Fig. 1;

Fig. 3 is a front view of the valve shown in Fig. 1, the wall of the chamber on which it is fixed being shown cut along the central plane of the valve;

Fig. 4 is a fragmentary view in longitudinal cross-section of the valve of Fig. 1, to a larger scale, mounted on the air chamber after the latter has been inflated;

Fig. 5 is a fragmentary view in longitudinal cross-section of the valve as above, during the inflation of the chamber;

Fig. 6 is a view in longitudinal cross-section of a valve made of two parts constructed as an alternative form of embodiment;

Fig. 7 is a side view of the valve shown in Fig. 6, the wall of the chamber on which it is fixed being shown cut along the central plane of the valve;

Fig. 8 is a fragmentary view in longitudinal cross-section of the valve shown in Fig. 6, to a larger scale, mounted on the chamber after the latter has been inflated;

Fig. 9 is a view in cross-section of the valve as above shown in Fig. 6, during the inflation of the chamber;

Fig. 10 is a view in longitudinal cross-section of a valve made in two parts, following a further alternative form of embodiment;

Fig. 11 is a front view of the valve shown in Fig. 10;

Fig. 12 is a view in cross-section to a larger scale of the valve shown in Fig. 10, during the inflation of the chamber;

Fig. 13 is a view of the connecting tube used for the inflation or deflation of the chamber, or to determine its pressure during inflation;

If reference is made to Fig. 1, it will be seen that the body 1 of the valve of rubber or plastic material, is composed of a circular base or flange 2 with tapered or thinned edges 3 and integral with a tubular portion or valve stem 4 open at the end opposite to the base, and a central closure valve 5. The flange 2 extends radially outwardly of the valve stem for mounting the valve. In this embodiment, the valve is thus made in one single piece.

The closure valve 5 is formed by a closure member formed as an annular inner flange of domed shape shown in Fig. 1, and having a central marginal portion normally closing the conduit 6 of the tubular stem portion 4, and extending radially inwardly of the valve stem and in a direction corresponding to a downstream direction of the valve stem. The marginal portion of the inwardly extending flange has arcuate contacting surfaces defining oppositely and centrally disposed recesses on opposite sides of the contacting surfaces. The inner flange also has an annular reduced section in an annular zone adjacent the inner wall of the stem portion and a number of cylindrical reinforcements 7 which leave a circular clearance 9 between themselves and the edge 8 of the tubular portion. The closure member 5 is formed with lips 10 which form the arcuate contacting surfaces with oppositely disposed recesses 11. It is provided with an orifice 12 along the axis of the valve, without removing any material.

The valve is vulcanised on the air chamber after its base or flange 2 has been applied against the chamber, the central domed portion 13 projecting from the body of the valve being engaged in a corresponding circular housing in the wall of the chamber.

The extremity 14 of the tubular portion is closed by a plug 15 which is held in position by means of ribs 16 which engage in the corresponding grooves formed in the tubular portion. This engagement is made possible by means of the hollowed portion 17 of the plug 15 which permits of a certain elastic compression of the plug at the moment when it passes into the tubular portion, which expands by a roughly equal amount. The closure is thus obtained in a perfectly air-tight manner.

The operation of the valve is as follows: with the plug 15 removed, the extremity of an inflating tube is introduced into the tubular portion 4, the inflation tube being provided in the same way at the plug 15, with a series of ribs such as 16. The pressure of the compressed air applied in the direction of the arrows 18 of Fig. 5, pushes the closure member 5 which expands outwards concentrically and causes the orifice 12 to appear, the cross-section of this orifice increasing with the inflating pressure and thus permitting air to pass into the chamber.

When the inflation is stopped, the pressure of air in the chamber applied in the direction of the arrows 19 of Fig. 4, tends to force the closure member into the tubular portion. In this movement, the closure member is concentrically compressed, and the orifice 12 is closed with a force which increases with the pressure of air contained in the pneumatic tire.

The forcing action of the closure member into the tubular portion 4 is further limited by the reinforcements 7 which come into contact with the cylindrical wall of the tubular portion, as shown in Fig. 4.

The air-tightness of the valve is thus absolutely perfect.

Fig. 6 shows an alternative form of construction of a valve formed in two parts, one external to the chamber formed by the main valve body 20 with its base 21 with tapered edges 22 and its tubular portion 23 adapted to receive the plug 24, and the other part being formed by the closure member 25 with its base 26, which is located inside the air chamber, as shown in Fig. 7. The body 20 has a central projecting portion 27. The valve body and the closure device which enclose the chamber are assembled and centered with respect to each other by the penetration of the circular core 27 of the valve body into the housing 28 formed in the closure member, after which they are vulcanised in this position.

The core 27 has an incurved seat 29 which limits the penetration of the closure member under the pressure of the air in the chamber. The conduit 30 passes through the core 27 and opens into the conduit 31 of the tubular portion.

The operation of this valve is similar to that of the valve previously described: during inflation, the air pressure, which is applied in the downstream direction of the valve shown as arrow 32 (see Fig. 9), lifts the closure member and causes the orifice 33 to appear, this orifice having been formed in the axis of the closure member without removing material, and providing a passage for the air.

As soon as the inflation is stopped, the pressure of the air in the direction of the arrow 34 (see Fig. 8), corresponding to an upstream direction as to the valve forces down the closure member which is concentrically compressed to close tightly the orifice 33.

In this case, the downward movement of the closure member is limited by the seat 29 of the valve body.

Fig. 10 shows a further alternative form of valve made of two parts enclosing the wall of the chamber. This valve comprises on the one hand a main valve body 35 with its base 36 having tapered edges 37, its tubular portion 38 receiving the plug 39 and, on the other hand, the closure member 40 with its base 41 located in the interior of the chamber. The valve body and the closure member are again assembled as in the previous case.

The closure member 40 is provided at its centre with a boss 42, mounted under tension on the seat 43 of the body 45 by its thinner portion 46 which is pierced along a circumference with a number of orifices 44. The diameter of this circumference is determined in such manner that when at rest, the orifices are applied against the flat face of the seat 43.

In this case, the plug 39 is provided with a projecting edge 44a so as to enable its interior portion 45 to be given a shorter length, whilst holding it more firmly in position and providing a better protection against dust.

The operation of this valve, similar to that of the preceding valves, is illustrated in Fig. 12. When air under pressure is introduced in the direction of the arrows, the body 42 lifts and the air then passes into the chamber through the orifices 44. When the pressure of air is removed, the body 42 falls back on the seat 43 due to the effect of the pressure existing inside the chamber, and under the effect of the elastic tension of the part 46.

There has been shown in Fig. 13 a connecting tube or push-tube which enables the chamber to be inflated or deflated or its pressure to be measured. This push-tube is composed of a tube 47 having a length and cross-section appropriate for each valve, provided at its extremity with an enlarged portion 48 provided with rolls 49 and the base portion 50, which enables it to be fitted in place of the valve plug. On the base 50 is fixed the tube 51 which can be connected to the usual air pumping apparatus, to a pump or to a pressure gauge for measuring its pressure.

In order to deflate the tire, the tube 47 is introduced into the valve by fixing it in place of the plug. The extremity 53 of the tube 47 then lifts the lips 10 of the valve (see Fig. 1), the body 25 of Fig. 6, or the body 42 of Fig. 10, enabling the air to pass out of the chamber and to escape through the orifice 52.

In order to measure the pressure, a pressure gauge may be fitted to the extremity 52, or, in order to inflate the chamber, a compressed air supply of the usual kind is fitted on the end 52.

In the case of the valve shown in Fig. 12, orifices 54 must be provided, bored radially on the tube 47 so as to permit the air to escape, since in this case the inside bottom of the body 42 closes the extremity of the conduit 53.

I claim:

1. A pneumatic valve for an inflatable member comprising, a valve body having a longitudinally extending portion defining a hollow valve stem portion and a flange extending radially outwardly of the valve stem for mounting the valve, an annular, inner flange integral with said valve stem extending in a direction radially inwardly of the valve stem and in a direction corresponding to a downstream direction of the valve stem, the inner flange having a central marginal portion defining a normally closed air channel, the marginal portion having arcuate contacting surfaces defining oppositely and centrally disposed recesses on opposite sides of the contacting surfaces, and the inner flange having an annular reduced section in an annular zone adjacent the inner wall of the valve stem portion and defining an annular seating surface seatable on the valve stem when the valve is closed and subjected to pneumatic pressure in a direction corresponding to an upstream direction in the valve stem portion thereby to maintain the valve closed in the absence of a downstream pressure exceeding the pressure acting in an upstream direction.

2. A pneumatic valve for an inflatable member comprising, a valve body having a longitudinally extending portion defining a hollow valve stem portion and a flange extending radially outwardly of the valve stem for mounting the valve, an annular, inner flange integral with said valve stem extending in a direction radially inwardly of the valve stem and in a direction corresponding to a downstream direction of the valve stem, the inner flange having a central marginal portion defining a normally closed air channel, the marginal portion having arcuate contacting surfaces defining oppositely and centrally disposed recesses on opposite sides of the contacting surfaces, and the inner flange having an annular reduced section in an annular zone adjacent the inner wall of the valve stem portion and defining an annular seating surface seatable internally of the valve stem when the valve is closed and subjected to pneumatic pressure in a direction corresponding to an upstream direction in the valve stem portion thereby to maintain the valve closed in the absence of a downstream pressure exceeding the pressure acting in an upstream direction.

3. A pneumatic valve for an inflatable member comprising, a valve body having a longitudinally extending portion defining a hollow valve stem portion and a flange extending radially outwardly of the valve stem for mounting said valve, an annular, inner flange cooperating with said valve stem to seat thereon and extending in a direction radially inwardly of the valve stem and disposed in a direction corresponding to a downstream direction of the valve stem, the inner flange having a portion defining a normally closed air channel, the inner flange having arcuate seat surfaces defining concentric recesses on at least one side of said seat surfaces, and the inner flange having an annular recess in an annular zone adjacent the inner wall of the valve stem portion defining an annular surface seatable on the valve stem portion when the valve is closed and subject to pneumatic pressure thereby to maintain the valve closed in the absence of a downstream pressure exceeding the pressure acting in an upstream direction.

References Cited in the file of this patent

UNITED STATES PATENTS

| 621,849 | Rickman | Mar. 28, 1899 |
| 1,389,362 | Jones | Aug. 30, 1921 |
| 1,561,714 | Greener | Nov. 17, 1925 |
| 2,710,623 | Kolos | June 14, 1955 |
| 2,758,609 | Dickert | Aug. 14, 1956 |

FOREIGN PATENTS

| 361,746 | Italy | Aug. 3, 1938 |
| 437,511 | Italy | July 5, 1948 |